United States Patent [19]

Hönig

[11] Patent Number: 4,571,990
[45] Date of Patent: Feb. 25, 1986

[54] METHOD AND APPARATUS FOR MEASURING THE RATE OF AIR FLOW IN THE INTAKE TUBE OF AN INTERNAL COMBUSTION ENGINE

[75] Inventor: Günter Hönig, Ditzingen, Fed. Rep. of Germany

[73] Assignee: Robert Bosch GmbH, Stuttgart, Fed. Rep. of Germany

[21] Appl. No.: 578,866

[22] Filed: Feb. 10, 1984

[30] Foreign Application Priority Data

Feb. 11, 1983 [DE] Fed. Rep. of Germany ....... 3304710

[51] Int. Cl.$^4$ ............................................ G01M 15/00
[52] U.S. Cl. .......................................... 73/118; 73/204
[58] Field of Search ................. 73/118, 204; 123/478, 123/494; 364/551

[56] References Cited

U.S. PATENT DOCUMENTS

4,404,846 9/1983 Yamauchi et al. .................... 73/118

Primary Examiner—Jerry W. Myracle
Attorney, Agent, or Firm—Walter Ottesen

[57] ABSTRACT

The invention is directed to a method and an apparatus for measuring the air-flow rate in the intake tube of an internal combustion engine using a flow-measuring device which is insensitive to the direction of flow. In order to avoid incorrect measuring results when pulsations of the air flow occur, the reverse flow is sensed and, based on a total flow signal, deducted to determine the forward flow. At the points where the direction of flow is reversed, certain physical relationships prevail between flow-measuring signal, differential pressures, the presence of maxima and minima in the flow signal and the gradient of the flow signal. Several methods are disclosed to determine these reversal points as are flow charts for a computer-controlled determination of the air-flow rate.

14 Claims, 8 Drawing Figures

METHOD AND APPARATUS FOR MEASURING THE RATE OF AIR FLOW IN THE INTAKE TUBE OF AN INTERNAL COMBUSTION ENGINE

FIELD OF THE INVENTION

The invention relates to a method and apparatus for measuring the rate of air flow in the intake tube of an internal combustion engine.

BACKGROUND OF THE INVENTION

A constant-temperature anemometer using a hot wire is known from U.S. Pat. No. 3,747,577. Hot-wire air-mass sensors of this type operate very accurately and have been perfected for mass production. The principle of operation of hot-wire air-mass sensors is the cooling of the hot wire as a function of the air-flow rate. However, their use becomes problematical if the direction of flow is reversed because the cooling effect of the hot wire is independent of the direction of flow; this means that the hot-wire air-mass sensor measures the total air flow, whereas for use in a motor vehicle, only the air flowing in the direction of the internal combustion engine is of relevance.

SUMMARY OF THE INVENTION

The method and apparatus of the invention for measuring the rate of air flow in the intake tube of an internal combustion engine afford advantages over known methods and apparatus by the added ability to measure the direction of air flow. Thus, this invention enables the air-flow rate in the intake tube to be determined in the direction of the internal combustion engine at a very high degree of precision. As a result, it also permits a precision adjustment of fuel metering with all its advantages such as clean exhaust gas and low fuel consumption.

BRIEF DESCRIPTION OF THE DRAWING

The invention will now be described with reference to the drawing wherein.

DESCRIPTION OF THE PREFERRED EMBODIMENTS OF THE INVENTION

Figure 1:
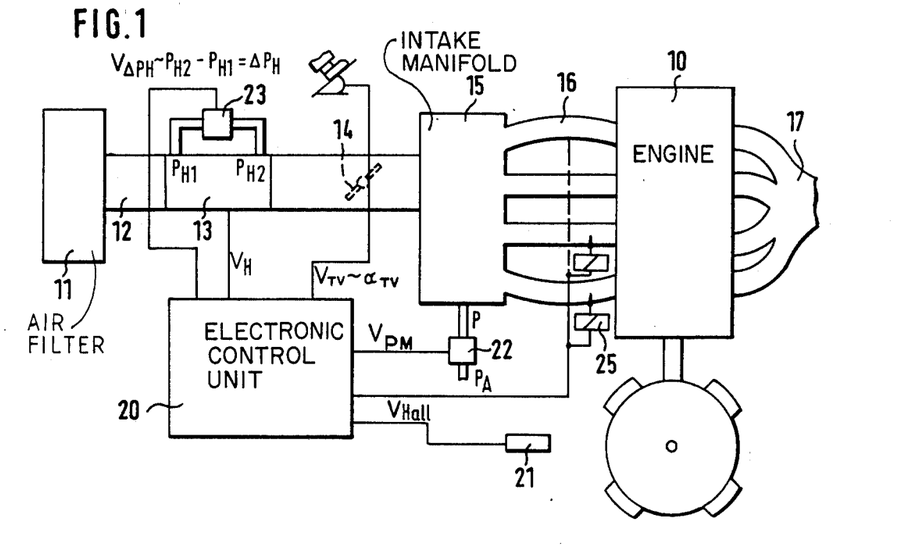
FIG. 1 is an overview block diagram of a spark-ignited internal combustion engine including the control units for fuel metering.

FIG. 1 is an overview schematic depicting the most essential components of a spark-ignited internal combustion engine incorporating an arrangement for metering fuel to the engine. Reference numeral 10 identifies the internal combustion engine. Located upstream from the internal combustion engine when viewed in the direction of the air flow are, in succession, an air filter 11, an intake tube 12 containing a hot-wire air-mass sensor 13 not illustrated herein in greater detail, a throttle valve 14, an intake manifold 15, as well as manifold branch conduits 16 the number of which is determined by the number of cylinders of the internal combustion engine. On the exhaust side is the exhaust manifold 17.

Reference numeral 20 denotes an electronic control unit receiving at its input rotational-speed signals from an engine-speed sensor 21, further signals from the hot-wire air-mass sensor 13, pressure signals from a manifold-pressure sensor 22 which may also be configured as a sensor measuring the pressure differential relative to the external pressure $V_{PM}$, signals indicative of the throttle-valve position $V_{TV}$, and a pressure signal indicative of the pressure above the hot-wire air-mass sensor $V_H$. In the embodiment shown, the electronic control unit 20 in turn controls intermittently actuatable injection valves 25 located at the ends of the manifold branch conduits 16 at the internal combustion engine.

Currently known systems process engine speed and air-quantity signals for a basic injection signal which is then corrected, if necessary, in dependence upon the temperature and the opening position of the throttle valve.

The air quantity per induction stroke is determined by the following equation:

$$Q = \int_0^T \dot{Q}(dt) \text{ wherein: } \dot{Q} = f(V_H) \tag{1}$$

The air flow pulsates in dependence upon the induction strokes, with the throttle valve 14 providing for decoupling by damping.

Under high-load conditions with the throttle valve fully or almost fully open, high pressure oscillations occur in the intake tube 12 causing significant variations in the air flow. The magnitude of pressure oscillations is dependent upon the position of the throttle valve as well as on reflections of the pressure wave from the closed intake valves of the remaining cylinders in combination with natural resonances of the individual manifold branch conduits 16. The oscillations propagate from the intake valve on the engine upstream to the hot-wire air-mass sensor 13 in the intake tube 12 at the velocity of sound and are partially reflected on the air filter according to the law of acoustics. The pressure oscillations cause corresponding oscillations in the air flow Q pursuant to the following relationships:

$$\dot{Q} \sim -\frac{dp}{dx} = p' \tag{2a}$$

$$\ddot{Q} \sim -\frac{d^2p}{dx} = p'' \tag{2b}$$

The physical conditions of the formation and propagation of the pressure waves provide for continuity for $p'$ and $p''$ and thus also for $Q$, $\dot{Q}$ and $\ddot{Q}$.

If the pressure gradient over the hot-wire sensor 13 is less than zero (this applies also by approximation to the pressure differential between manifold pressure p and external pressure p), a force acts in the direction of the air filter in opposition to the air flow, initially reducing only the velocity of flow. The direction of flow is reversed at high pulsations if the integral $$I = \int_{\alpha_1}^{\alpha_2} p' dt \qquad (3)$$

exceeds a value dependent on the maximum amount of air flow.

Within the intake tube 12, the hot-wire sensor 13 constitutes a kind of bottleneck having a specific geometry. The relationship between the pressure ratios above the hot-wire sensor and the volume of air flowing therethrough is provided by the following equation:

$$\frac{dp}{dx} = \frac{d\dot{Q}}{dt} - (\dot{Q})^2 \cdot K \qquad (4)$$

If the pressures $P_{H1}$ and $P_{H2}$ are measured with aid of sensor 23 on each side of the hot-wire sensor as shown in FIG. 1, the following equation results due to the constant difference in the measuring points:

$$\Delta P_{H21} = P_{H2} - P_{H1} \frac{d\dot{Q}}{dt} - (\dot{Q})^2 \cdot K \qquad (5)$$

Neglecting the static term, there results:

$$\Delta P_{H21} \sim \frac{d\dot{Q}}{dt} \qquad (6)$$

Figure 2A:
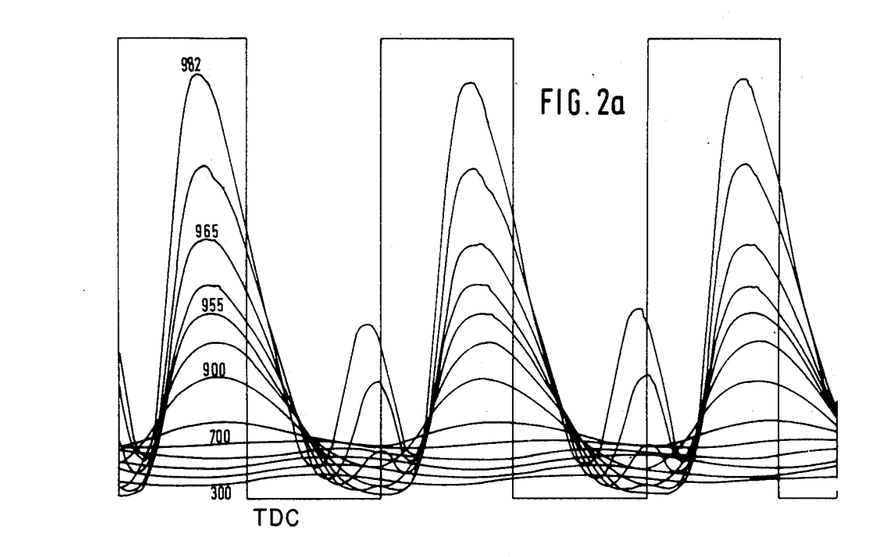
FIGS. 2a and 2b are a family of curves showing rate of air-flow passing over the hot-wire, air-mass sensor plotted against the angular position of the crankshaft.

FIG. 2 shows a series of measurements for a specific type of internal combustion engine. FIG. 2a shows plots of the air flow $\dot{Q}$ under different load conditions which are entered in the form of pressure values at a predetermined high external pressure. The horizontal axis denotes the angular position of the crankshaft. At condition of low load, the flow of air is relatively constant. At higher loads, that is, with pressures in the manifold 15 increasing, the flow of air becomes wavy. At medium loads, this waviness is manifested by alternately higher and lower air-flow rates in the intake tube. From a specific load condition on, the oscillations in the air intake tube becomes so high that the force of the pressure acting in opposition to the normal direction of flow is so high as to reverse the direction of air flow. However, the hot-wire sensor of known configuration cannot distinguish between the individual directions of flow so that it issues an air-flow signal also in the presence of such a reverse-flow of air. This reverse flow is manifested in the smaller maxima lying between the main maxima of the air flow.

It is the purpose of an evaluation circuit for the hot-wire sensor to determine the mass of air flowing in the direction of the internal combustion engine from the signal indicating the total mass of air flow; more specifically, the evaluation circuit deducts the portions corresponding to the reverse flow mass from the values of the total quantities of the mass of air-flow measured.

A condition precedent for achieving this purpose is to recognize the points at which the flow of air reverses.

Figure 2B:
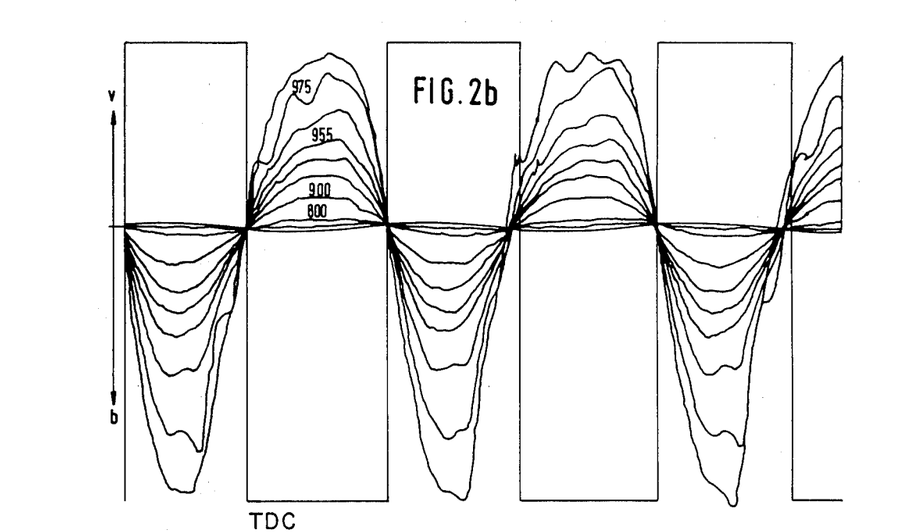

A comparison of the two FIGS. 2a and 2b shows the maximum and minimum of the air flow in the region of zero crossover of the $\Delta p$ values for a flow with no flow reversal. If the direction of flow is reversed, the minima of the signal curves of FIG. 2a are at values greater than zero of the signal curves of FIG. 2b. The commencement of flow reversal is identified by a minimum of the air flow and a $\Delta p > 0$ according to the graph of FIG. 2b.

Accordingly, the end of the reverse flow is identified by the second minimum of the air flow and a value of $\Delta p < 0$, with reversed polarity. Depending on the type of the differential-pressure signal, the polarity may also be in the opposite direction. An embodiment of this invention makes use of this relationship by determining on this basis the flow-reversal points, followed by a determination of the total volume of air delivered to the internal combustion engine per induction stroke.

The signal plotted in FIG. 2b is determined by measuring means and represents the differential-pressure signal over the hot-wire sensor shown in FIG. 1. In a suitably adapted form, it is also possible to use for signal evaluation the differential pressure between manifold and the ambient, or the differential between the pressure prevailing immediately downstream from the hot-wire sensor and the ambient pressure. Finally, the possibility exists to determine the pressure pattern of FIG. 2b by computation in which a single computation of the pressure course at relatively low loads can be sufficient to be able to reproduce the occurrence of the above relationships.

Figure 3A:
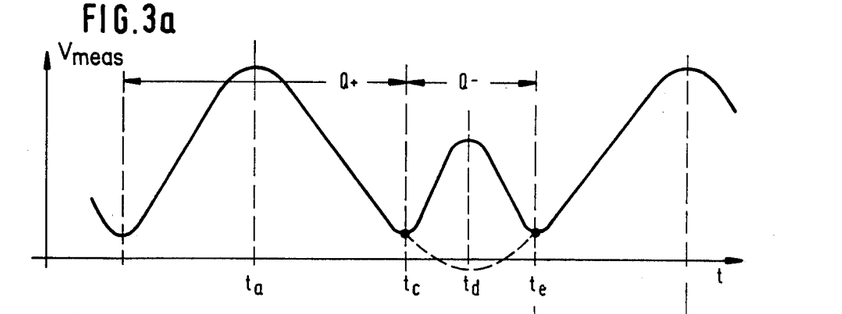
FIGS. 3a and 3b are simplified diagrams depicting the relationships shown in FIGS. 2a and 2b, respectively.
Figure 3B:
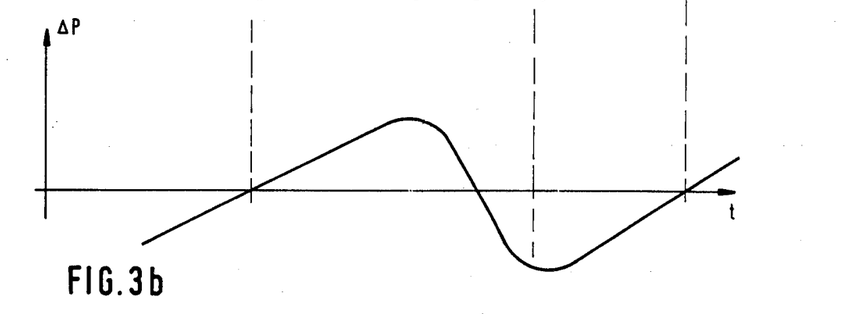

FIG. 3 repeats in a simplified representation the interrelationships established in FIG. 2 by measuring means. Accordingly, FIG. 3a shows the air-flow rate in the high-load range with flow reversal taking place; and, FIG. 3b shows the relevant differential-pressure relationships.

It also appears noteworthy that it is not necessary to place high demands on the accuracy of the pressure sensor because only the upper-load range is of relevance in this regard; and, in this range, it is only the dynamic relationships that are of interest. The basic accuracy for the load signal is supplied by the hot-wire sensor.

The computational relationships may be briefly summarized as follows:

Without flow reversal:

(a) The air flow is at a maximum when:

$$\dot{Q} = 0; p' \approx 0; \frac{dp}{dt} > 0 \qquad (7)$$

(b) The air flow is at a minimum when:

$$\dot{Q} = 0; p' = 0; \frac{dp}{dt} < 0; \ddot{Q} \text{(curvature)} < 0 \qquad (8)$$

With flow reversal, the following relationships result:

(c) First reversal point at time $t_c$, transition to reverse flow:

$$\dot{Q}=0; \ddot{Q}<0; p'>0 \qquad (9)$$

(d) The reverse flow is at a maximum when $$\dot{Q}=0; \ddot{Q}>0; p'\approx 0 \qquad (10)$$

(e) Second reversal point at time $t_e$, change to normal flow:

$$\dot{Q}=0; \ddot{Q}<0; p'<0 \qquad (11)$$

A reverse-flow condition is present in the period between $t_c$ and $t_e$ so that the following formula applies for the total volume of air supplied to the internal combustion engine per induction stroke:

$$Q=Q_+ - Q_-$$

When determining the quantity of air flow in practice, the procedure applied is as follows:

1. determine the possible reverse-flow range corresponding to a fixed reference quantity obtained from load and engine speed;
2. scan the output signal of the hot-wire sensor with linearization and scan the pressure signal in angle-synchronous or time-synchronous raster;
3. sum up the individual air-flow increments for: $Q_+$ and/or $Q_-$;
4. identify the flow-reversal points from the above-described relationships between air-flow rate and differential pressure; and,
5. form the total sum: $Q = Q_+ - Q_-$.

Figure 4:
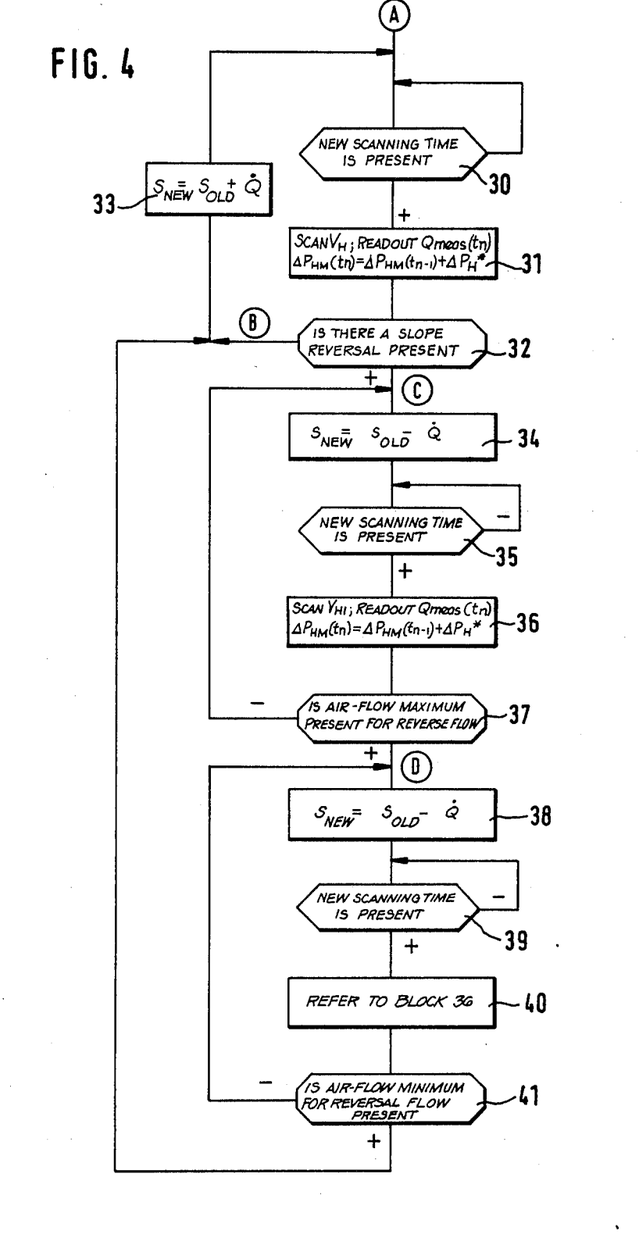
FIG. 4 is a flow diagram for computer-controlled implementation of the method of the invention utilizing pressure-signal evaluation.

The above-described embodiment of this invention is suitably implemented by means of a computer programmed in accordance with a flow chart illustrated in more detail in FIG. 4.

In the flow chart of FIG. 4, the letter A marks the beginning of the sequence of operations. The first step of the sequence is to scan to determine whether or not a new scanning time point or scanning angle point is present (block 30). In the next block 31, the hot-wire sensor signal $V_H$ is scanned, and a signal $\dot{Q}_{meas}(t_n)$ is read out via a linearization. In addition, the differential pressure $\Delta P_H^*$ is scanned and the signal is filtered, for example, using the following formula:

$$\Delta P_{HM}(t_n) = \Delta P_{HM}(t_{n-1}) + \Delta P_H^*$$

This corresponds to the formation of a mean value for the differential pressure.

The subsequent inquiry unit 32 determines whether a slope reversal for $\dot{Q}$ is present ($\dot{Q} < 0$ after $\dot{Q} > 0$) according to the following three conditions:

$$\dot{Q}_{meas}^*(t_n) - \dot{Q}_{meas}^*(t_{n-K}) > \text{threshold 1} \quad (13)$$
$$\dot{Q}_{meas}^*(t_{n-K-V}) - \dot{Q}_{meas}(t_{n-K}) > \text{threshold 2}$$
$$\Delta P_H^* \text{ (filtered)} > \text{threshold 3}$$

If no slope reversal is present, a new sum for the air flow is formed in block 33:

$$\text{Air flow } S(t_n) \text{Air Flow } S(t_{n-1}) + \dot{Q}_{meas}^*(t_n) \quad (14)$$

wherein: $n = n + 1$

If a flow reversal is detected (Letter C in FIG. 4), the most recent air-flow rate is subtracted in block 34 $[S(t_n) = S(t_{n-1}) - \dot{Q}_{meas}^*(t_n)]$, in contrast to the addition in block 33. This is followed by another test for a new scanning point in block 35. In the next block 36, $\dot{Q}_{meas}(t_n)$ is again determined with follow-on filtering $\dot{Q}_{meas}^*(t_n)$; in addition, an inquiry for the differential pressure $\Delta P_H$ is performed and likewise filtered according to formula (12). The following inquiry unit 37 determines an air-flow maximum for the reverse flow. This is accomplished by means of the following equations:

$$\dot{Q}_{meas}^*(t_{n-K}) - \dot{Q}_{meas}^*(t_n) > \text{threshold 4} \quad (15)$$
$$\dot{Q}_{meas}^*(t_{n-K}) - \dot{Q}_{meas}^*(t_{n-K-V}) > \text{threshold 5}$$

If this air-flow maximum is not yet present, the sequence of operations is started again at C in FIG. 4. If it is, a new value of the total air quantity is formed in block 38:

$$\text{Air flow } S(t_n) = \text{Air flow } S(t_{n-1}) - \dot{Q}_{meas}^*(t_n) \quad (16)$$

wherein: $n = n + 1$

Subsequent to another inquiry for a new scanning point block 39), the air-quantity value is again scanned with follow-on filtering, and the value of the differential pressure is scanned, likewise followed by filtering according to formula:

$$\Delta P_{HM}(t_n) = \Delta P_{HM}(t_{n-1}) + \Delta P_H^* \quad (17)$$

In the inquiry unit 41, finally, a more recent slope reversal is determined according to the formulae:

$$\dot{Q}_{meas}^*(t_n) - \dot{Q}_{meas}^*(t_{n-K}) > \text{threshold 6} \quad (18)$$
$$\dot{Q}_{meas}^*(t_{n-K-V}) - \dot{Q}_{meas}^*(t_{n-K}) > \text{threshold 7}$$

If the reverse-flow condition continues to be present, the program jumps back to location D of FIG. 4; if not, the program jumps back to B.

The threshold values mentioned in connection with blocks 32, 37 and 41 are preferably functions of operating characteristic quantities, for example, of a mean pressure value resulting from an algebraic summation of the individual pressure increments $\Delta P_{HM}$ during an induction stroke and a division by the number of increments. The scanning time is adapted in dependence upon the curvature of the Q curve, in order to obtain a better detection of the reversal points.

The above-described methods for detecting the air-flow reversal points in the intake tube require a pressure signal that is either measured directly or calculated indirectly. However, it is also possible to obtain the reversal points directly from the signal waveform of the rate of air flow. This is described with reference to the signal waveform shown in FIG. 5.

As already explained with reference to FIGS. 2 and 3, a minimum of air flow without pulsation occurs at the same point where a maximum, even if it be a reduced maximum, of air flow occurs in the presence of pulsation (M). If pulsation is present, a minimum of air flow exists on either side of this reduced maximum.

Another embodiment of this invention is directed to marking the minimum of the flow in the absence of pulsation. If pulsation is present, a maximum occurs at this point, and the first minimum signaled occurs before this marked point which preferably corresponds to a crank shaft angle. The occurrence of pulsation is then detected by the fact that the original minimum becomes a maximum, and the adjacent minima of the air flow become the reversal points. When the flow changes from normal to pulsation in point M, an additional characteristic is that the magnitude of the curvature is substantially higher when a pulsation occurs, that is, the radius of the curvature is smaller.

Position and magnitude of the minima and maxima covering a scanning period are stored in a memory. In the medium-load range, damping by the throttle valve only causes a minimum and a maximum according to the basic wave of the induction system:

Range:

$$Q_{max} - Q_{min} \approx Cl \cdot Q_{mean}$$

wherein: $Cl = 0.4$ to $0.6$ and $Q_{mean}$ = mean value of air flow

According to the equations for resonant circuits, these extreme values shift towards "early" as the loads increase and the damping decreases. Allowance for these changes may be made via (a) throttle valve engine speed performance characteristics;
(b) extrapolation from a shift from the medium-load range to the high-load range.

If at high loads a minimum precedes the minimum to be expected at medium loads with extrapolation to high loads, the condition for a flow-reversal point is satisfied. In this case, this minimum must lie within certain limits, related to TDC (top dead center):

$$\phi_{a1} \leq \phi - \phi_{a2} < \phi Q_{min}(\text{without flow reversal})$$

A corresponding reverse range from reverse flow to normal flow is present when:

$$\phi Q_{min}(\text{without flow reversal}) < \phi_{a3} \leq \phi \leq \phi_{a4}$$

Figure 6:
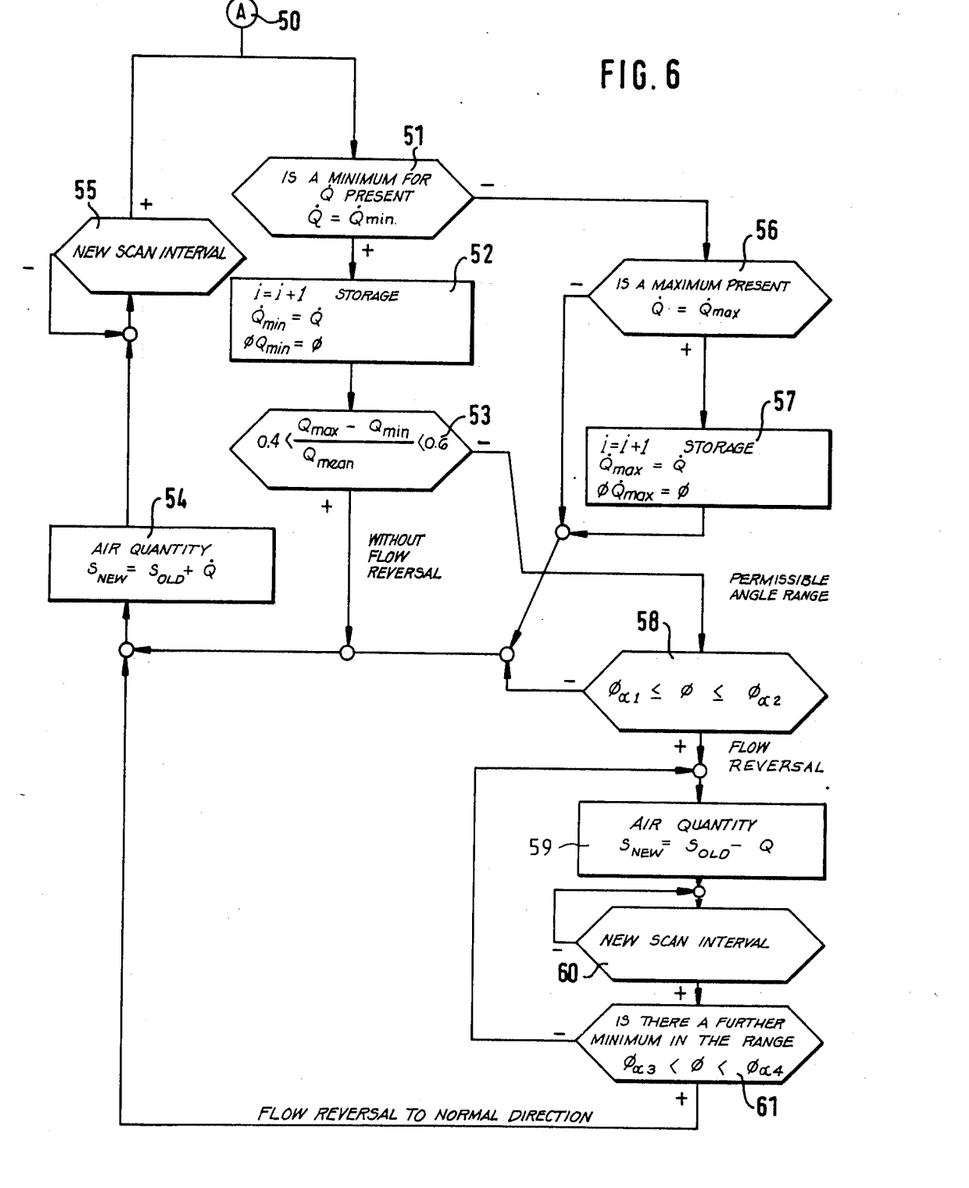

FIG. 6 is a flow chart depicting a computer-controlled implementation of the above-described possibility for the determination of the reversal points as well as the air-flow rate. The flow chart starts at an initialization point A designated by reference numeral 50. It is followed by a scan test for the minimum value at 51. If a minimum is detected, the instantaneous air-flow rate and the angle of that minimum are stored in memory, and the sequence continues at the scanning interval 52. Then follows an inquiry for a medium-load range 53 which enables minima that may occur as disturbances to be detected and suppressed as to their evaluation. This inquiry is performed according to the following formula:

$$0.4 < (\dot{Q}_{max} - \dot{Q}_{min})/\dot{Q}_{mean} < 0.6$$

If this condition is satisfied, the air quantity is added in block 54 in accordance with the formula:

$$S_{new} = S_{old} + Q$$

Then the scanning interval is tested in block 55 and, if a new interval is found to be present, the sequence returns to starting point 50 or test unit 51.

In the absence of a minimum for $\dot{Q}$, the program branches to test unit 56 which tests for a maximum. If no maximum is detected, control is transferred to block 54. In the presence of a maximum, air-flow rate and angle values are stored in block 57, and the scanning interval is increased. Then the value of the air-flow rate is again added in block 54.

If the test unit 53 detects a minimum outside the medium raster range, a subsequent block 58 tests for a permissible angle range (upper load-range differentiation). If the answer is no, the program returns to block 54. If it is yes, it is concluded that an air-flow reversal has taken place as result of which the new air quantity is computed in another block 59. However, since a flow reversal is involved, the following formula applies:

$$S_{new} = S_{old} - Q$$

This is followed by a test for a new scanning interval 60 and a test for another minimum within a permissible angle range 61. As long as the answers are no, a reverse-flow condition is assumed and the program continuously branches back to blocks 59 and 60. In the other case, that is, on detection of a second minimum in the right location, another flow reversal is assumed which in turn is to be interpreted as a return to the normal direction of flow. If this situation is present, the sequence continues with block 54.

The flow chart shown in FIG. 6 thus enables flow-reversal points to be detected and to draw from this the conclusions necessary for the computation of the quantity of air flowing in one direction.

Another possibility for determination of the pulsation as well as the reversal points exists by evaluating the air-quantity gradient. In the absence of a reverse flow, the tangents of the air-flow signal extend at a substantially smaller angle than in the presence of a reverse flow. This means that a reverse-flow condition is in the first place detected by a certain threshold in the pressure gradient, and finally a flow-reversal point can be determined at least by approximation via the intersection point of a tangent on the air-flow signal waveform with a defined voltage value.

The flow chart is nearly identical to the one of FIG. 4. In block 31, Q is filtered according to the flow and pulsation conditions in the induction part. Allowance is to be made particularly for the presence of resonance conditions. An equivalent pressure signal provides for the filtering.

Figure 5:
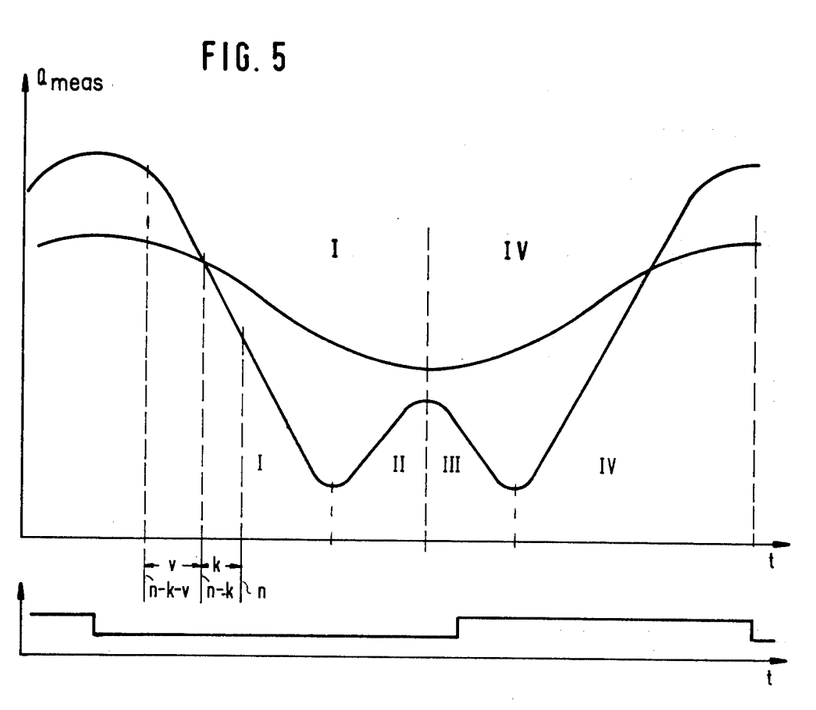
FIG. 5 is a graphical representation of the signals to explain the relationships without evaluation of the pressure signals; and, FIG. 6 is a flow chart to determine the air-flow rate by evaluating the positions of maxima and minima.

For a further explanation of the proposed signal processing, various scanning points and scanning-point ranges are shown in FIG. 5. These scanning points are synchronous with respect to either time or angle; in addition, they may be chosen such that they lie closer together in the area where the curvature is greater because it is only in these areas, that is, outside the normal maximum of air flow, that the signal sensing in respect to the detection of reversal points is relevant. It is to be understood that the measuring accuracy of the air-flow rate as well as the determination of the air-flow rate per induction stroke also depend on the degree of precision of the scanning operation.

Threshold values to be tested in signal processing in combination with the detection of a reverse-flow condition are suitably dependent on at least one of the engine-speed and load quantities.

To determine the air quantity per stroke, the output signal of the hot-wire or hot-film air-mass sensor is scanned equidistantly with respect to time or angle and converted into an air-flow increment via an equalization characteristic. The individual increments $\dot{Q}_n$ are summed up in a register according to the direction of flow. To reduce error signals, the summation is performed applying the trapezoidal or Simpson equation.

The summation is performed in a continuous sequence without start and end point. The quantity of air inducted per stroke within the range $t_o$ to $t_1 = t_o + T_n$ (this corresponds to a period in the air-quantity signal) is determined by subtracting $S(t_o)$ from $S(t_1)$. For the filter algorithm, it is necessary to have scanning values in the neighborhood of k, for example, from $Q_{n-k}$ to $Q_n$, which is easily possible in this representation using shift registers. Because the value of the relevant total sum S is always positive at each reference point independently of the direction of flow, a very simple evaluation results.

It has been shown that the above-described invention permits a very precise determination of the air-flow rate to a motor vehicle, enabling the internal combustion engine to be operated optimally in terms of performance and clean exhaust gas.

It is understood that the foregoing description is that of the preferred embodiments of the invention and that various changes and modifications may be made thereto without departing from the spirit and scope of the invention as defined in the appended claims.

What is claimed is:

1. Method for measuring the rate of air flow in an intake tube of an internal combustion engine wherein both forward and reverse flows of air occur, the engine being equipped with a measuring device such as a hot-wire sensor, hot-film sensor or the like for measuring the flow of air irrespective of the direction thereof and for providing a signal indicative of the instantaneous rate of flow, the method comprising the steps of:
   evaluating the shape of said signal to detect the actual points of flow reversal; and,
   subtracting the quantity of air occurring during reverse flow from the total quantity air flow.

2. The method of claim 1 comprising the step of processing the position of the maxima and minima of the curve of said signal to determine the flow reversal.

3. Method for measuring the rate of air flow in an intake tube of an internal combustion engine equipped with a measuring device such as a hot-wire sensor, hot-film sensor or the like for measuring the flow of air irrespective of the direction thereof, the method comprising the steps of:
   evaluating the shape of the air flow curve when forward flow and reverse flow ocur to determine points of flow reversal;
   processing the position of the maxima and minima of the curve to determine the flow reversal;
   processing a pressure signal to detect and evaluate a reverse flow in the upper load range; and,
   subtracting the quantity of air occurring during reverse flow from the total quantity air flow.

4. The method of claim 3, wherein said pressure signal is a pressure-differential signal.

5. The method of claim 4, said differential-pressure signal $\Delta P_H$ being the pressure difference across said measuring device.

6. The method of claim 4, said differential-pressure signal $\Delta P_H$ being the pressure difference between a point downstream of the measuring device and the ambient.

7. The method of claim 3, said pressure signal being computed in accordance with the approximation formula:

$$dp/dx = d\dot{Q}/dt.$$

8. The method of claim 3 comprising the step of evaluating the following relationships:
   (a) beginning of the reverse flow: minimum of Q and $\Delta P_H \neq 0$; and,
   (b) end of the reverse flow: minimum of Q and $\Delta P_H \neq 0$; however, with respect to the preceding reversal point, a changed sign of the pressure.

9. The method of claim 3 comprising the step of determining the reversal points via crossover points of threshold values with tangents on the flow signal curve.

10. The method of claim 9 comprising the step of computing the rate of air flow by continuously scanning individual values of rates of air flow and making a subtraction in the event of a reversal of flow.

11. The method of claim 10 comprising the step of increasing the accuracy of the computation by selecting the scanning points closer together in regions of relatively intense changes in Q.

12. The method of claim 3 comprising the step of storing a minimum of the air flow with reference to time or angle during a normal flow and recognizing reverse flows via the changeover of the minimum to a maximum and using the immediately preceding minimum of the flow as a reversal point.

13. Apparatus for measuring the rate of air flow in an intake tube of an internal combustion engine, the apparatus comprising:
   measuring means for measuring the instantaneous rate of flow and for providing a signal indicative thereof;
   means for differentiating this signal and for recognizing and storing maxima and minima thereof;
   signal processing means for recognizing points of flow reversal from said rate of flow signal; and,
   means for determining the air flow in one direction from a total air flow signal minus a reverse flow signal.

14. The apparatus of claim 13 comprising means for processing a differential pressure signal.

* * * * *

UNITED STATES PATENT AND TRADEMARK OFFICE
CERTIFICATE OF CORRECTION

PATENT NO. : 4,571,990

DATED : February 25, 1986

INVENTOR(S) : Günter Hönig

It is certified that error appears in the above-identified patent and that said Letters Patent is hereby corrected as shown below:

In column 3, line 43: delete "becomes" and substitute -- become -- therefor.

In column 5, line 8: add -- an -- after the word "in".

In column 6, line 4: delete "block 39)" and substitute -- (block 39) -- therefor.

In column 8, line 54: delete "$t_o$to" and substitute -- $t_o$ to -- therefor.

In column 9, line 29: delete "ocur" and substitute -- occur -- therefor.

UNITED STATES PATENT AND TRADEMARK OFFICE
CERTIFICATE OF CORRECTION

PATENT NO. : 4,571,990

DATED : February 25, 1986

INVENTOR(S) : Günter Hönig

It is certified that error appears in the above-identified patent and that said Letters Patent is hereby corrected as shown below:

In column 10, line 9: delete "Q" and substitute -- $\dot{Q}$ -- therefor.

In column 10, line 11: delete "Q" and substitute -- $\dot{Q}$ -- therefor.

In column 10, line 24: delete "Q." and substitute -- $\dot{Q}$. -- therefor.

Signed and Sealed this

Twenty-ninth Day of July 1986

[SEAL]

Attest:

Attesting Officer

DONALD J. QUIGG

Commissioner of Patents and Trademarks